March 1, 1927.

C. W. ROBERTS 1,618,999

GREENHOUSE BENCH

Filed March 8, 1926   2 Sheets-Sheet 1

Inventor:
Charles W. Roberts;
By Robert W. Candle,
Attorney

March 1, 1927.　　　　　　　1,618,999
C. W. ROBERTS
GREENHOUSE BENCH
Filed March 8, 1926　　　2 Sheets-Sheet 2
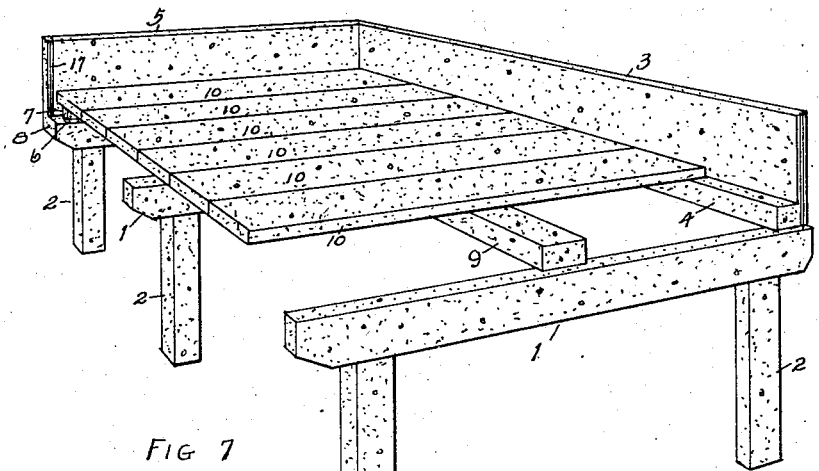
FIG 7
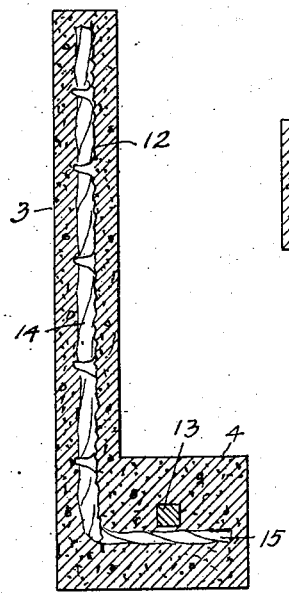
FIG 8
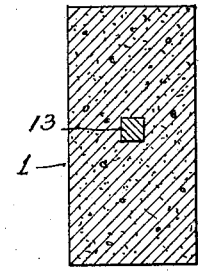
FIG 9　　　FIG 10
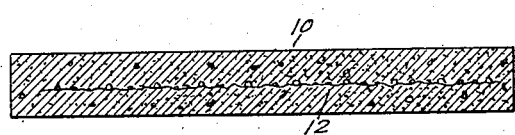
FIG 11
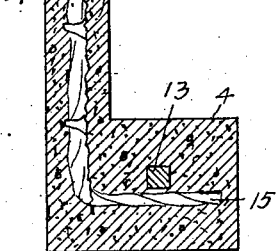
FIG 12
Inventor:
Charles W. Roberts;
By Robert W. Randle,
Attorney.

Patented Mar. 1, 1927.

1,618,999

UNITED STATES PATENT OFFICE.

CHARLES W. ROBERTS, OF CENTERVILLE, INDIANA, ASSIGNOR OF ONE-HALF TO JOSEPH H. HILL, OF RICHMOND, INDIANA.

GREENHOUSE BENCH.

Application filed March 8, 1926. Serial No. 93,120.

The object of my present invention, broadly speaking, is to provide greenhouse benches in which plants may be grown, the same being strong and durable in construction, which will be practically indestructible, easily formed and assembled, and which is connected together without nails, bolts, or other separate securing means; the same being adapted to be piled flat for storage or transportation whereby the parts will occupy but a minimum of space, and which will be easily and quickly assembled when required in operative position, and also forming such device whereby it can be manufactured, sold, and installed at a comparatively low price.

In greenhouses, especially where roses and other flowers are grown, it is the practice to provide benches which have flat bottoms, with sides extending upward therearound, and supported on legs which extend down to the floor or ground. It is customary to construct such benches of wood or the like, and as the benches must have soil therein with growing plants rooted in the soil, and as moisture has to be supplied thereto, therefore it is evident that the wooden benches soon rot and become damaged and have to be frequently replaced. The object of this invention is to provide such benches formed of reinforced concrete, thereby entirely eliminating any wooden parts, whereby the benches will be practically indestructible, and will not be effected by moisture or atmospheric conditions.

Other objects and particular advantages of the invention will be made apparent in the course of the following description, and that which is new will be correlated in the appended claims.

Figure 1:
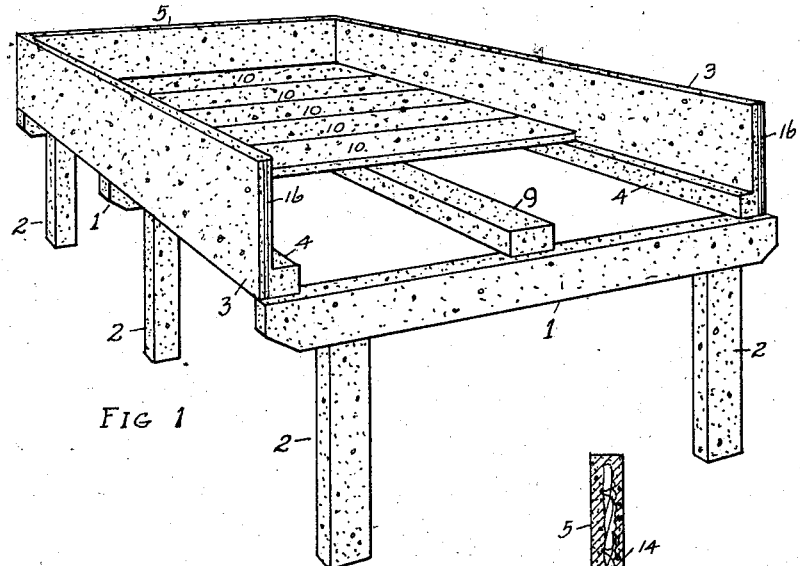
Figure 5:
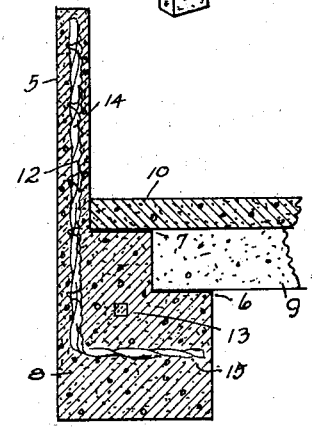
Figure 2:
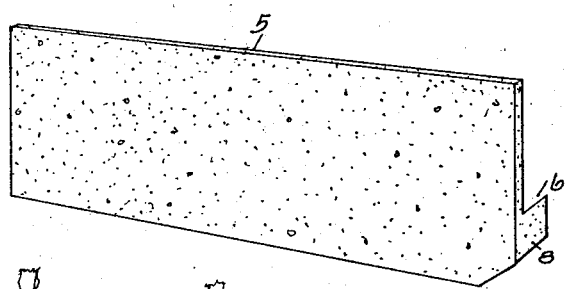
Figure 6:
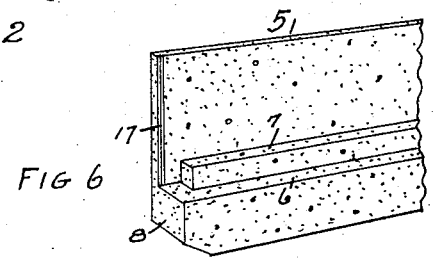
Figures 3, 4:
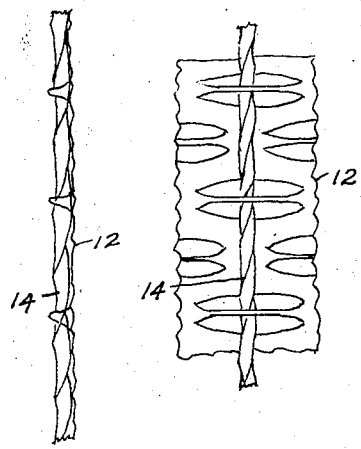

The preferred means for carrying out the principles of my invention in a practical and efficient manner is shown in the accompanying drawings, in which—Figure 1 is a perspective view of one section of a bench, one end member being omitted. Figure 2 is an outside perspective view of one of the end members. Figure 3 is an edge view of a portion of a reinforcing sheet, in connection with a reinforcing rod. Figure 4 is a face view of the parts shown in Fig. 3. Figure 5 is a cross section of either one of the end members, also showing one of the bottom members in section, and a part of one of the center rails. Figure 6 is a perspective view of a portion of either one of the end members. Figure 7 is a perspective view of a portion of one section of my bench, taken directly opposite to Fig. 1, and showing the end member of the bench which is opposite to the end member shown in Fig. 1, but identical therewith. Figure 8 is a cross section of either one of the side members. Figure 9 is a cross section of one of the center rails. Figure 10 is a cross section of either one of the cross rails. Figure 11 is a cross section of one of the bottom members. And Figure 12 is a top plan of the adjoining portions of an end member and a side rail.

Similar indices denote like parts throughout the several views.

In order that the construction and the several advantages of my invention may be more fully understood and appreciated, I will now take up a detailed description thereof, in which I will set forth the same as fully and as comprehensively as I may.

Referring now to the drawings in detail: the construction is composed, first, of a plurality of cross rails 1, which are spaced the desired distance apart, parallel with each other. Each of said cross rails is supported by two legs 2, whose lower ends should rest on a solid floor, or on a foundation, or they may each extend down into a concrete foundation formed in the floor.

Numeral 3 denotes the main or vertical portion of each side member, and extending inward from the lower portion of the side members, integral therewith, is a base or flange 4, which extends the full length thereof, with their lower faces even with the edges of the member 3. The side members, and their bases, rest on the end portions of the rails, and they extend at right angles thereto, as shown. Numeral 5 denotes the main or body portion of the end members, which extend lower down than the side members. Extending from the lower edge of each member 5 is the compound flange or base 8, which forms the shoulders 6 and 7. The shoulder 6 takes the place of a rail 1 at the ends of the bench, and it is on a level with the tops of said rails. The part forming the shoulder 7 is of less length than the shoulder 6, in order to provide for the ends of the side members to fit in place therewith.

Resting on the shoulder 6, and extending across on the central portion of the rails 1, is the center rail 9, which is of the same thickness vertically as is the thickness vertically of the flanges 4, and the distance vertically between the faces 6 and 7.

Numeral 10 denotes each a plurality of bottom members, which form the floor of the bench. The members 10 extend across and fit between the two side members and rest on the flange 4 and the rail 9, and continue between the ends 5, but they do not fit tight together, in order to allow proper drainage and ventilation therebetween.

It is to be understood that each bench may consist of but a single section, by placing the ends 5 across each end of the section shown in Fig. 1, which would complete the enclosure and provide a complete bench. Or, as will be most frequently the case, a plurality of sides 3 may be placed end-to-end and extend in that manner for a long distance, which would place the two ends 5 a long distance apart, in which case the rail 9 would be continued by like members, and also an additional number of rails 1, and legs 2, would be added, corresponding to that shown in Fig. 1.

All of said parts are formed of concrete molded to the shape shown; and the sides 3, the ends 5, and the bottom members 10 are provided with metal reinforcement sheets, like the sheet 12 shown in Fig. 4, which is known as "metal lath", but said metal sheets are entirely enclosed and covered by the concrete of which the respective members are formed.

Also certain of the parts are provided with square and twisted reinforcing rods 13 which extend longitudinally and centrally through the base flanges 4 and 8, the rails 1, and the center rail 9, extending between and to near each end thereof and entirely imbedded therein.

Also a plurality of square and twisted reinforcing rods 14 are located in each of the sides 3 and in each of ends 5, shown in Figs. 8 and 5 respectively. The lower portions of the rods 14 are bent inward at right angles thereto forming the inturned portions 15 which extend into the members 4 and 8, substantially as shown.

The vertical portions of the rods 14 are interlaced into connection with the metal sheets 12 which contact therewith, as indicated in Figs. 3, 4 and 8, thereby forming compound reinforcement.

At the junctures of various parts sealing apertures are formed. For instance, in the ends of the members 3 there is a half-round channel 16, and likewise in the inner faces of the members 5 a half-round channel 17 is formed near each end thereof.

When the various parts are assembled the said channels are so located that each of the channels 16 registers with one of the channels 17, the two thereby forming a round channel which is to be filled with cement or concrete in fluid form, whereby said parts are sealed together closing the joints therebetween.

In practice a quantity of each of the several parts are constructed in molds made therefor and then when they are desired they can be put together without cutting of lumber or driving nails.

The legs 2 are first located, and the rails 1 laid thereon. The sides 3 are then set in position and connected by the end members 5. The center rail 9 is then rested on the shoulder 6, with its upper edge level with the shoulder 7. The members 10 are then laid in position shown in Fig. 1, after which the bench will be ready for use, except sealing the joints as above set forth, which can be done at any time.

It is evident that in practice the construction will afford all of the advantages and objects above enumerated.

I desire that it be understood that various changes may be made in the several details of construction, without departing from the spirit of the invention and without sacrificing any of the advantages thereof which are new and useful.

Having now fully shown and described my invention, what I claim, and desire to secure by Letters Patent of the United States, is—

1. A greenhouse bench consisting of spaced apart sides, flanges extending inward toward each other from the bottom portion of said sides, end members connecting said sides, flanges extending inward toward each other from the bottom portions of said ends, with said flanges of the ends forming upper and lower shoulders, a center rail resting at its ends upon the lower shoulders of the ends, a plurality of bottom members resting on said flanges of the sides and on said center rail and extending over on the upper shoulders of the ends, means for supporting said parts above the ground line, and all of said parts formed of reinforced concrete.

2. A greenhouse bench comprising a plurality of cross rails, legs for supporting said rails, side members resting on said rails at right angles thereto, end members connecting the ends of the side members, a center rail resting on said cross rails, inturned flanges at the lower edges of the side members, inturned flanges at the lower edges of the ends and forming an upper and a lower shoulder with the center rail resting at its ends upon the lower shoulders of said flanges of the end members, bottom members extending between the side members and covering the space between the end members and resting on the flanges of the side members and upon the center rail and projecting onto the upper shoulders of the flange of the end members, and means for sealing the adjoining portions of the ends and the sides, all of said parts being formed entirely of reinforced concrete.

In testimony whereof I have hereunto subscribed my name.

CHARLES W. ROBERTS.